United States Patent [19]

Szecsei

[11] Patent Number: 4,552,030
[45] Date of Patent: Nov. 12, 1985

[54] GEAR DRIVE

[76] Inventor: Joseph Szecsei, 2555-8th Concession Rd., R.R. #3, Windsor, Ontario, N9A 6Z6, Canada

[21] Appl. No.: 507,242

[22] Filed: Jun. 23, 1983

[51] Int. Cl.⁴ ............................................. F16H 55/08
[52] U.S. Cl. ......................................... 74/462; 74/460
[58] Field of Search ................................. 74/460, 462

[56] References Cited

U.S. PATENT DOCUMENTS 4,047,449 9/1977 Popov ..................................... 74/458
4,200,000 4/1980 Fluehmann ........................... 74/462

FOREIGN PATENT DOCUMENTS 194220 5/1919 Canada .

Primary Examiner—Ronald C. Capossela
Attorney, Agent, or Firm—Arne I. Fors; Robert F. Delbridge

[57] ABSTRACT

A self-aligning gear train of enhanced load transmitting capacity comprises a pair of cylindrical gear wheels having intermeshing teeth with concavo-convex side surfaces. The opposed, peripheral surfaces of the intermeshing cylindrical gear wheels are square providing increased surface contact between meshing gear teeth from the base to the edges of the teeth with the convex tooth surface of one gear engaging a concave tooth surface of the other gear to provide self alignment of one cylindrical wheel with the other.

3 Claims, 4 Drawing Figures

U.S. Patent Nov. 12, 1985 4,552,030
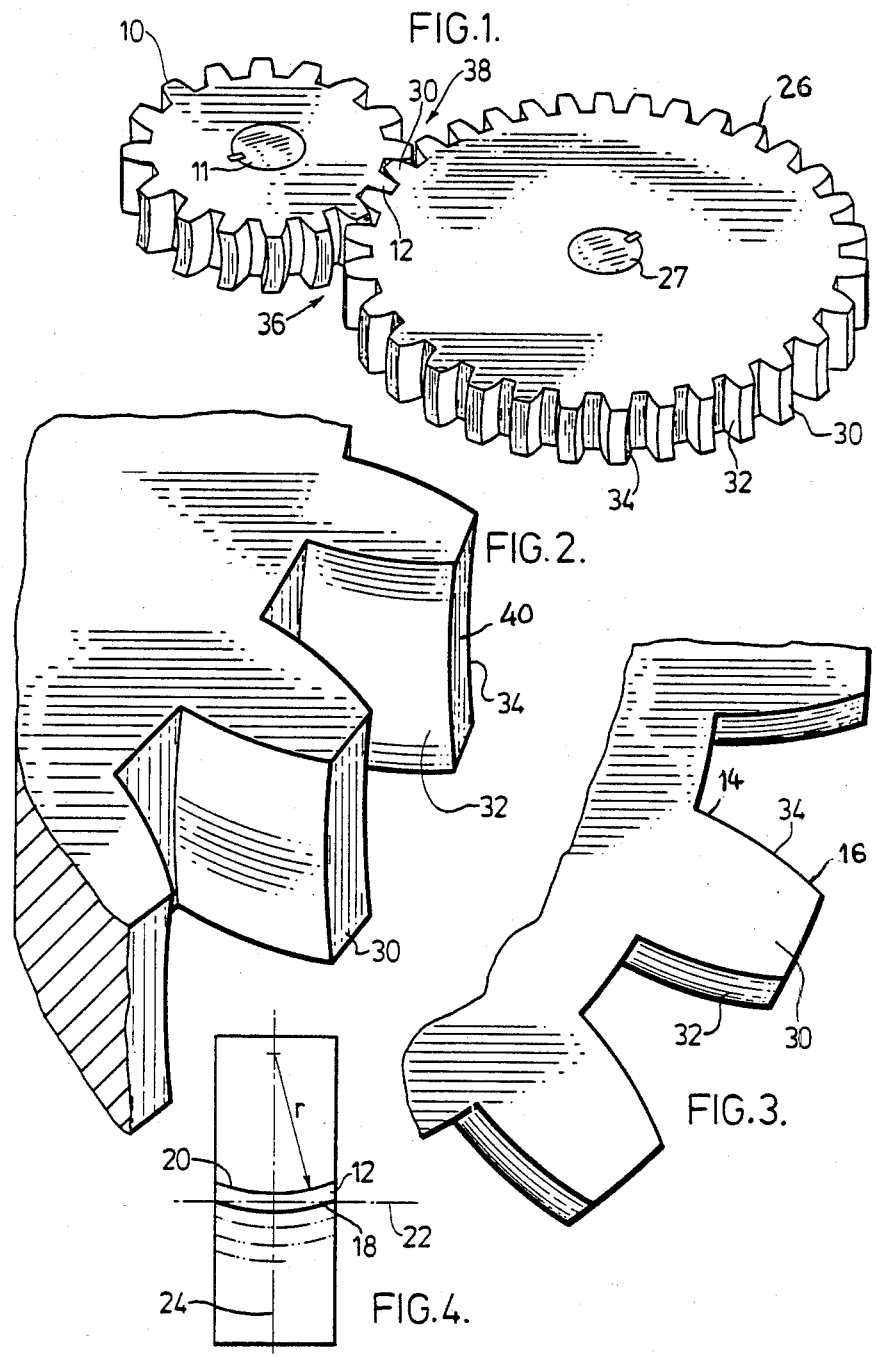

GEAR DRIVE

This invention relates to gear drives and, more particularly, relates to a gear train having cylindrical gear wheels with intermeshing gear teeth having concavo-convex surfaces.

Conventional cylindrical gear wheels have planar teeth adapted to intermesh for transmission of torque by linear contact between the teeth as the gears rotate. This type of gearing is not self-aligning and is prone to wear.

The use of herringbone gears increases the contact surfaces between intermeshing gears and assists self alignment of the gears. However, the teeth surfaces have complex shapes and are not only difficult but also costly to manufacture.

U.S. Pat. No. 4,047,449 discloses a complex and costly gear train having a worm wheel with a transversely concave periphery and convex teeth to increase linear contact with the side surfaces of the intermeshing globoid worm thread.

I have found that an effective, self-aligning gear train of enhanced load transmitting capacity can be provided by the use of a gear assembly comprising a pair of cylindrical gear wheels having intermeshing teeth with concavo-convex side surfaces. The opposed, peripheral surfaces of the inter-meshing cylindrical gear wheels are square providing increased surface contact between meshing gear teeth from the base to the edges of the teeth with the convex tooth surface of one gear engaging a concave tooth surface of the other gear to provide self alignment of one cylindrical wheel with the other while further increasing surfacing contact.

The cylindrical gear wheels can be easily manufactured by means of a rotary cutting tool to obtain the desired convex and concave arcuate teeth surfaces.

In its broad aspect, the gear train of my invention comprises a first cylindrical gear wheel having a plurality of teeth formed equispaced therearound, each tooth having a transversely concavo-convex shape with a convex side surface and an opposite concave side surface, and a second cylindrical gear wheel having a plurality of teeth equispaced thereabout with the same circumferential spacing as the spacing of the teeth formed on the first cylindrical gear wheel, the teeth of said second gear wheel having a concavo-convex shape with a convex side surface and an opposite concave side surface, and means for rotatably mounting said cylindrical gear wheels for meshing of the gear teeth with each other.

More particularly, the teeth of the gear drive cylindrical wheels have opposite convex and concave side surfaces with the same radius of curvature, the ends of the teeth being square in transverse cross-section.

The invention will now be described with reference to the accompanying drawings, in which:

FIG. 1 is a perspective view showing a pair of intermeshing cylindrical gear wheels of the present invention;

FIG. 2 is an enlarged perspective view, broken away, of representative gear teeth;

FIG. 3 is a plan view of the gear teeth shown in FIG. 2; and

FIG. 4 is a schematic plan view of a gear wheel illustrating the concavo-convex shape of a representative gear tooth.

The gear train of my invention illustrated in FIG. 1 normally comprises a small diameter cylindrical gear wheel 10, i.e. a pinion gear, mounted on a shaft or axle 11 for rotation. Gear 10 has a plurality of teeth 12 formed equispaced about the periphery thereof, teeth 12 gradually diminishing in thickness, as shown in FIGS. 2 and 3, from base 14 to free end 16 in a conventional manner. With reference to FIG. 4, each of teeth 12 has a transversely concavo-convex shape with a convex surface 18 on one side and a corresponding concave surface 20 on the other side, each of surfaces 18, 20 having a radius r. The chord 22 passing through each tooth is perpendicular to a longitudinal plane 24 passing through the gear.

Large gear wheel 26, normally a driven gear wheel, mounted for rotation on a shaft or axle 27, has mating teeth 30 which correspond in shape and size both radially and transversely with the teeth 12 of cylindrical gear wheel 10, said teeth having an equal radius for the convex and concave surfaces. The teeth of gear wheel 26 having transversely convex and concave surfaces 32, 34 respectively engage with and disengage with the mating teeth of cylindrical gear wheel 10 as they enter at the gear train 36 and leave at 38. I have found, for example, that the combination of a pinion gear 10 having a diameter of 15 inches with a normally driven gear 26 having a diameter of 60 inches, each gear having concavo-convex teeth with a transverse radius r of 16 inches, provides effective transmission of torque with excellent self alignment of the gear wheels. The extended transverse length and the radial length of the concavo-convex intermeshing teeth terminating in a square transverse periphery or end surface 40 having a uniform width across the length thereof increase the load-carrying capacity of the gear train while maintaining the gear wheels in alignment.

The gears can be of different size, as illustrated, or of substantially equal diameter.

The present invention provides a number of important advantages. The gear wheels comprising the gear train can be easily manufactured at low cost. The gear wheels are self-aligning at assembly, provide enhanced load transmission with reduced wear due to the increased surface contact between meshing teeth, and are quiet in operation.

It will be understood, of course, that modifications can be made in the embodiment of the invention described and illustrated herein without departing from the scope and purview of the invention as defined in the appended claims.

What I claim as new and desire to protect by Letters Patent of the United States is:

1. A gear train comprising, in combination, a first cylindrical gear wheel having a plurality of teeth formed equispaced therearound, each tooth having a transversely concavo-convex shape with a convex side surface and an opposite concave side surface terminating in a square end surface having a uniform width, and a second cylindrical gear wheel having a plurality of teeth equispaced thereabout with the same circumferential spacing as the spacing of the teeth on the first cylindrical gear wheel, each tooth of said second gear wheel having a concavo-convex shape with a convex side surface and an opposite concave side surface terminating in a square end surface having a uniform width, the said teeth of the said gear wheels having opposite convex and concave side surfaces with the same radius of curvature and having the same uniform width, the periphery of each of said gear wheels having a square transverse cross-section, and means for rotatably mounting said cylindrical gear wheels for meshing of the gear teeth with each other.

2. A gear drive as claimed in claim 1 in which one of said gear wheels is a pinion gear.

3. A gear drive as claimed in claim 1 in which the teeth of the said gear wheels have opposite convex and concave side surfaces with the same radius of curvature, the periphery of each of said gear wheels has a square transverse cross-section, and one of said gear wheels is a pinion gear.

* * * * *